(12) United States Patent
Liu

(10) Patent No.: US 10,962,460 B2
(45) Date of Patent: Mar. 30, 2021

(54) FREE FALL BALL PENETROMETER WITH A BOOSTER

(71) Applicant: Dalian University of Technology, Dalian (CN)

(72) Inventor: Jun Liu, Dalian (CN)

(73) Assignee: Dalian University of Technology, Liaoning (CN)

( * ) Notice: Subject to any disclaimer, the term of this patent is extended or adjusted under 35 U.S.C. 154(b) by 199 days.

(21) Appl. No.: 16/329,652

(22) PCT Filed: Dec. 27, 2017

(86) PCT No.: PCT/CN2017/119036
§ 371 (c)(1),
(2) Date: Feb. 28, 2019

(87) PCT Pub. No.: WO2019/127110
PCT Pub. Date: Jul. 4, 2019

(65) Prior Publication Data
US 2019/0346353 A1    Nov. 14, 2019

(51) Int. Cl.
*G01N 11/12*      (2006.01)
*E21B 45/00*      (2006.01)
*E02D 1/02*       (2006.01)

(52) U.S. Cl.
CPC ............ *G01N 11/12* (2013.01); *E02D 1/02* (2013.01); *E21B 45/00* (2013.01)

(58) Field of Classification Search
CPC .................................. G01N 11/12; E02D 1/02
See application file for complete search history.

(56) References Cited

U.S. PATENT DOCUMENTS

| 4,806,153 A | 2/1989 | Sakai et al. |
| 10,384,746 B2 * | 8/2019 | Liu ........................ B63B 21/26 |
| 2007/0125158 A1 * | 6/2007 | Kelleher ................. E02D 1/022 |
| | | 73/84 |

(Continued)

FOREIGN PATENT DOCUMENTS

| CN | 1790017 A | 6/2006 |
| CN | 201250400 Y | 6/2009 |

(Continued)

*Primary Examiner* — Suman K Nath
(74) *Attorney, Agent, or Firm* — Muncy, Geissler, Olds & Lowe, P.C.

(57) ABSTRACT

A free fall ball penetrometer with a booster is dynamically penetrated into the seabed through its kinetic and potential energies. The main measuring instrument is a ball penetrometer, which is subject to end bearing resistance, drag force, and soil buoyant force during the dynamic penetration process within the soil. Based on the measured data from the accelerometer and load cell, the soil strength parameters including the undrained shear strength and strain-rate parameter can be back-analyzed. The added booster can: (1) effectively increase the penetration depth of the ball penetrometer and hence enlarge the range of measured penetration depths; and (2) improve the directional stability and avoid the rotation of the ball penetrometer during the falling process. The force data measured from the load cell, together with the acceleration data from the accelerometer, can further improve the measured accuracy.

6 Claims, 7 Drawing Sheets

(56) References Cited

U.S. PATENT DOCUMENTS

2017/0233968 A1   8/2017   Cai et al.

FOREIGN PATENT DOCUMENTS

| CN | 103147432 A | 6/2013 |
| CN | 105258683 A | 1/2016 |
| CN | 105571931 A | 5/2016 |
| CN | 106192969 A | 12/2016 |
| CN | 108152170 A | 6/2018 |

* cited by examiner

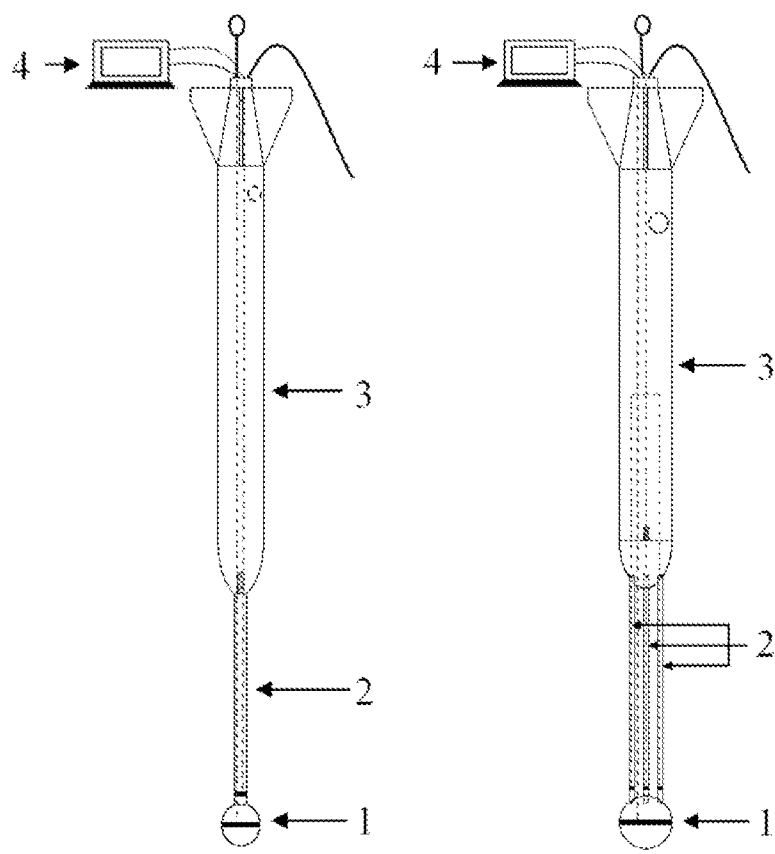
Fig. 4(a)   Fig. 4(b) (as an illustration in Abstract)

FREE FALL BALL PENETROMETER WITH A BOOSTER

TECHNICAL FIELD

This invention belongs to the field of ocean engineering technology. The present invention relates to a free fall ball penetrometer with a booster. The ball penetrometer is dynamically penetrated into the seabed with the aid of the booster, and the measured data are used to analyze the soil strength parameters.

BACKGROUND

Offshore structures are indispensable in the exploitation of offshore space and resources. The long-term stabilities of these structures are maintained by the interaction between structures and seabed. Therefore, systematical geotechnical investigations should be conducted thoroughly to determine the soil parameters, which provide references for geotechnical design. Current methods used to determine the strength and other related parameters of the clayey soil include cone penetration test (CPT), vane shear test, T-bar penetration test, Ball-bar penetration test, and free fall penetration (FFP) test.

For the CPT, the cone penetrometer is statically penetrated into the seabed with a constant velocity, during which the soil characteristics are analyzed based on the measured tip resistance on the cone tip, frictional resistance along the shaft and pore water pressure. For the CPT, the measured data should usually be corrected by the following steps:

(1) correct the pore water pressure;
(2) correct the soil overburden stress; and
(3) select an appropriate end bearing capacity factor, Ni.

In deep sea investigations, the overburden stress is usually high and will affect the penetration resistance after calibration. Moreover, based on the large deformation finite element (LDFE) analysis, Ma et al. indicated that the end bearing capacity factor of the cone penetrometer increases with increasing soil rigidity, which increases the difficulty in interpreting CPT data.

Compared to CPT, T-bar and Ball-bar penetrometers are full-flow penetrometers and the corresponding measured results are without necessary to calibrate the overburden stress. The ball-bar penetrometer is a sphere, while the T-bar penetrometer is a cylinder. Therefore, the T-bar penetrometer is vulnerable to suffer higher bending moment in the soil with space variability, which affects the accuracy of the measured data. A local full-flow mechanism of soil is formed around the T-bar or ball penetrometer during the penetration process, and hence the corresponding end bearing capacity factor ($N_b$) can be theoretically determined. By performing plasticity limiting analysis, Randolph et al. indicated that: for ball penetrometer, the low bound and upper bound limits of $N_b$ are 10.98 and 11.80 when the soil-ball interface is smooth (i.e. the frictional coefficient at the ball-soil interface $\alpha=0$); and the low bound and upper bound limits of $N_b$ are 15.10 and 15.54 when the soil-ball interface is fully rough (i.e. $\alpha=1$). Zhou et al. carried out LDFE analyses to calculate the end bearing capacity factor of the ball during its penetration process in the soil, and the results showed that $N_b$ is 10.97 with $\alpha=0$ and is 15.19 with $\alpha=1$.

In the practice application of the ball penetrometer, a connecting rod is connected between the ball penetrometer and loading device. The theoretical analysis in Randolph et al. ignored the effect of connecting rod on the end bearing capacity factor. Chung et al. carried out field tests to investigate varied area ratio of rod to ball, $A_r$, ($A_r = A_{shaft}/A_t$, $A_{shaft}$ is the sectional area of connecting rod, $A_t$ is the projected area of the ball penetrometer) on the measured resistance of the ball penetrometer, and the results indicated that $A_r$ should be less than 0.15 to avoid the effect of connecting rod on measured soil resistance. Zhou et al. conducted numerical simulation to analyze the value of $A_r$ on the penetration resistance on the ball penetrometer, and their results indicated that the effect of connecting rod can be ignored with $A_r < 0.1$.

As mentioned above, a loading device is needed for CPT, T-bar and ball penetration tests. In addition, to accommodate the loading device, special geotechnical research or survey vessels are required in the deep-sea field investigations. While a FFP is dynamically penetrated within the seabed after free fall in the water column without any loading device. Currently, two types of FFPs are typically used, the free fall cone penetrometer and the free fall ball penetrometer. During the dynamic penetration of a FFP in the seabed, the soil drag force, together with the soil strain-rate effect, should be taken into consideration. Steiner et al. carried out field tests using the free fall cone penetrometer to measure the soil strength. Their results indicated that the back-analyzed undrained shear strength from the free fall cone penetrometer after correcting the strain-rate effect and drag force is consistent with that from the static CPT. Chow et al. analyzed the measured data of the free fall cone penetrometer by conducting centrifuge tests. The back-analyzed soil undrained shear agreed well with that from the T-bar penetration tests, and the strain-rate parameter can be back-analyzed based on the measured results. However, the forces acting on the free fall cone penetrometer is complex. The soil strain-rate effect at the cone tip is different with that along the shaft, and the latter one is usually higher than the former one. In addition, the measured results of a free fall cone penetrometer should also be calibrated like a static CPT.

Morton et al. carried out both field and centrifuge free fall ball penetration tests, in which the soil strength parameters, including the soil undrained shear strength and strain-rate parameter, could be determined based on the acceleration data measured during the penetration of the ball within the soil. In field and centrifuge tests, the ball diameters were D=0.25 m and D=0.02 m, respectively. The artificial gravity acceleration in the centrifuge tests was set as 12.5 g. The final penetration depths were 10 D in field tests and 5.5 D in centrifuge tests, respectively. The impact velocity of the free fall ball penetrometer was relatively low, which was 8 m/s based on the field testing data in Morton et al. Moreover, the weight of the ball penetrometer was relatively low. Hence the penetration depth of the ball penetrometer is relatively shallow, and the measured depth is limited. In addition, the free fall ball penetrometer would rotate during its dynamic penetration in the soil, which influences the measured results. For the free fall ball penetrometer in field and centrifuge tests, the soil strength parameters were back-analyzed just based on the data of acceleration during the free fall process in water and dynamic penetration process in the soil. Chow et al. indicated that, for the free fall cone penetrometer, the soil strength parameters back-analyzed only based on the acceleration data is not reliable.

Generally, the static penetration tests (CPT, T-bar and ball penetration tests) are conducted with the aid of a loading device, which is limited in offshore investigations. Compared with the static penetration test, the operation procedures of a FFP are simple. However, the forces on the free fall cone penetrometer are rather complex. The final penetration depth of a free fall ball penetrometer within the seabed is limited due to the relative low impact velocity and low mass, thus the measured depth is limited and the measured results are not accurate.

SUMMARY OF THE INVENTION

To overcome the aforementioned technical limitations, a free fall ball penetrometer with a booster is invented as shown in FIG. 1. The present free fall ball penetrometer belongs to a freefall penetrometer, and the corresponding penetration depth is governed by a booster as shown in FIG. 2. The booster is beneficial in increasing the measured depth of the free fall penetrometer. Moreover, the booster can avoid the ball penetrometer from rotating during the penetration within the soil, and hence the measurement accuracy is improved. Attributed to the load cell added to the present invention, the measured accuracy is further improved based on the data both from the load cell and accelerometer.

The present invention relates to a free fall ball penetrometer with a booster, comprising two parts:

The first part comprises a ball penetrometer 1 and a connecting rod 2. The connecting rod 2 is used to connect the ball 1 and booster 3 as shown in FIG. 3. A pore water pressure transducer 1a is instrumented in the equator of the ball penetrometer 1 to measure the dissipation of the pore water pressure after the dynamic penetration of the ball penetrometer 1. A load cell 2b is connected between the ball penetrometer 1 and one side of the connecting rod 2 to measure the penetration resistance during the dynamic penetration of the ball penetrometer 1 within the soil. The other side of the connecting rod 2 is connected to the booster 3 through threads 2a. The connecting rod forms a certain distance between the ball penetrometer 1 and booster 3 in order to avoid the influence of booster 3 on the flow mechanism of the soil around the ball penetrometer 1. The sectional area of the connecting rod 2 is determined based on the criterion that the measured soil resistance on the ball penetrometer 1 is not influenced by the connecting rod 2.

The second part comprises a booster 3, as shown in FIG. 2, which is used to increase the penetration depth of the ball penetrometer. The booster comprises a cylindrical shaft 3b with ellipsoidal tip and streamlined rear to reduce the resistance of booster during its free fall in water and dynamic penetration in the soil. The length of the booster shaft 3b can be adjusted based on practical measuring requirement. For a deep penetration depth, a longer cylindrical shaft can be used. Four rear fins 3d connected to the booster rear can improve the directional stability of the booster 3 during its free fall process in water, and the fin size can be adjusted based on the practical requirement. The tip of booster 3 is provided with internal threads 3a, which are used to connect external threads 2a on the connecting rod 2. An internal space is reserved towards the rear of the booster 3. The internal space is used to accommodate the accelerometer 3c, internal data acquisition card 3f, power supply device 3e, and other associated controlling devices. The accelerometer 3c is sealed in the internal space towards the rear of the booster 3, and the wire of the accelerometer is extended from the rear of booster 3 and is connected to the external data acquisition instrument 4. An installation line 3h and a retrieval line 3g are attached at the booster rear. After measurement, the booster 3 and ball penetrometer are retrieved by pulling the retrieval line 3g up, and the recorded data are imported.

The connecting rod 2 comprises single-shaft type one (see FIG. 3a) and three-shaft type one (see FIG. 3b). The three-shaft type connecting rod owns an improved ability of resisting bending moment and disturbance.

The distance between ball penetrometer 1 and booster 3 is four times the diameter of the ball penetrometer 1.

The ratio of the sectional area ($A_{shaft}$) of connecting rod (2) to the projected area ($A_t$) of ball penetrometer 1 should be less than 0.1.

The data acquisition and storage can use both internal and external data acquisition devices. If using external data acquisition and storage method, the corresponding details are shown in FIG. 4a), FIG. 4b), FIG. 5(a), and FIG. 5b). The operation procedures using the present free fall ball penetrometer with a booster are summarized as follows.

Step-1. The booster 3 and ball penetrometer 1 are connected through threads. Note the gravitational center of the ball penetrometer 1 must be in line with the central axis of booster 3 to improve the directional stability of ball penetrometer 1 during its free fall in water and dynamic penetration in the soil, and to avoid large inclination of the ball penetrometer, and hence to increase the impact velocity and penetration depth of ball penetrometer 1. Then connect the wires of all the transducers to the internal data acquisition card 3f or the external data acquisition instrument 4.

Step-2. Release the assembled free fall ball penetrometer 1 to the determined height above the seabed through the installation line 3h, and release the retrieval line 3g to the seabed surface. When the ball penetrometer is steady in water, turn on the internal data acquisition card 3f or the external data acquisition instrument 4, and prepare to start collecting data.

Step-3. Release the installation line 3h, allowing the ball penetrometer 1 to freely fall in the water column and dynamically penetrate within the seabed until the ball penetrometer is rest in the soil. After the dynamic penetration, the ball penetrometer 1 is allowed to be left in the soil for a period of time, during which the dissipation of the pore water pressure in the soil surrounding the ball penetrometer 1 is measured.

Step-4. After measurement, retrieve the penetrometer by pulling the retrieval line 3g up. Then the recorded data from the internal data acquisition card 3f or external data acquisition instrument 4 are exported to the computer for analysis.

First, the velocity and penetration depth of the ball penetrometer 1 are analyzed based on the recorded data from the accelerometer 3c. The velocity of the ball penetrometer 1 can be obtained by Eq. (1), and the penetration depth of the ball penetrometer 1 can be obtained by Eq. (2).

$$v = \int_0^t a\,dt \quad (1)$$

$$s_t = \int_0^t v\,dt \quad (2)$$

where a is the vertical acceleration of the penetrometer measured by accelerometer 3c, v is the vertical velocity of the penetrometer, $s_t$ is the vertical distance of the penetrometer.

The soil undrained shear strength can be back-analyzed based on the measured data of load cell 2b and accelerometer 3c, and the specific procedures comprise:

The forces acting on the ball penetrometer 1 during its dynamic penetration process within the seabed are depicted in FIG. 6 and can be written in Eq. (3).

$$(m+m')a = W_b + F_m - F_N - F_D - F_b \quad (3)$$

where m is the mass of ball penetrometer 1, a is the acceleration measured by accelerometer 3c, $W_b$ is the submerge weight of ball penetrometer 1 in water, $F_m$ is the measured force by load cell 2b, $F_N$ is the soil end bearing resistance on ball penetrometer 1 during its dynamic penetration within the seabed, $F_D$ is the soil drag force on ball penetrometer 1 during its dynamic penetration within the seabed, $F_b$ is the soil buoyancy on ball penetrometer 1, which is expressed as the product of displaced soil volume by ball penetrometer 1 and soil effective unit weight ($\gamma'$). Morton et al. suggested that during the acceleration (or deceleration) of the ball penetrometer 1, the surrounding soil around the ball moves and accelerates (or decelerates) together with the ball. Hence it is necessary to consider the added mass, m, which can be expressed in Eq. (4).

$$m' = C_m m_{soil} \qquad (4)$$

where $C_m$ is the added mass coefficient, which is usually valued as $C_m=0.5$, $m_{soil}$ is the displaced soil mass by the ball penetrometer 1, which can be described in Eq. (5).

$$m_{soil} = V_{ball} \rho_{soil} \qquad (5)$$

where $V_{ball}$ is the displaced soil volume by the ball penetrometer 1, and $\rho_{soil}$ is the density of the soil.

If the soil strain-rate effect during the dynamic penetration of the ball penetrometer 1 within the soil is taken into consideration, the soil end bearing resistance, $F_N$, in Eq. (3) can be expressed in Eq. (6).

$$F_N = R_f N_c s_u A_t \qquad (6)$$

where $N_c$ is the end bearing capacity factor of the ball penetrometer 1, $s_u$ is the measured soil undrained shear strength under the reference shear strain-rate, $A_t$ is the projected area of the ball penetrometer 1, $R_f$ is the strain-rate factor, which is expressed using the power law shown in Eq. (7).

$$R_f = \left(\frac{\dot{\gamma}}{\dot{\gamma}_{ref}}\right)^\beta = \left(\frac{v/D}{\dot{\gamma}_{ref}}\right)^\beta \qquad (7)$$

where $\dot{\gamma}$ is the shear strain-rate defined as the ratio of the velocity, v, to the diameter, D, of the ball penetrometer 1, $\dot{\gamma}_{ref}$ is reference shear strain-rate, $\beta$ is the strain-rate parameter usually ranging 0.034~0.14.

Liu et al. indicated the strain-rate factor, $R_f$, of a free fall cone penetrometer depends on the velocity, v, strain-rate parameter, $\beta$, non-Newtonian Reynolds number, $R_{en}$, and frictional coefficient, a based on numerical simulating results. Moreover, the expression of the strain-rate factor $R_f$ is fitted based on numerical simulating results. Therefore, the factor $R_f$ is expressed by Eq. (8).

$$R_f = f_1(v, \beta, \alpha, R_{en}) \qquad (8)$$

The non-Newtonian Reynolds number, $R_{en}$, in the above equation is expressed as Eq. (9).

$$R_{en} = \frac{\rho_{soil} v^2}{s_u} \qquad (9)$$

Therefore, the strain-rate factor, $R_f$, is expressed as:

$$R_f = f(v, \beta, \alpha, \rho_{soil}, s_u) \qquad (10)$$

The end bearing capacity factor, $N_c$, of the ball penetrometer 1 depends on the frictional coefficient, $\alpha$, and can be described as Eq. (11).

$$N_c = f_2(\alpha) = A_1 + A_2 \alpha + A_3 \alpha^2 \qquad (11)$$

where $A_1$~$A_3$ are undetermined parameters which can be determined from numerical simulations. For example, Liu et al. established the relationship between the end bearing capacity factor and frictional coefficient of the free fall cone penetrometer based on numerical simulations.

The soil drag force during the penetration process of the ball penetrometer 1 in the soil shown in Eq. (3) can be described by Eq. (12).

$$F_D = \tfrac{1}{2} C_D \rho_{soil} v^2 A_t \qquad (12)$$

where $C_D$ is the drag coefficient. Liu et al. indicated that the drag coefficient of a free fall cone penetrometer depends on the frictional coefficient $\alpha$, and non-Newtonian Reynolds number $R_{en}$, and the expression of $C_D$ can be determined from numerical simulating results. Therefore, the factor $C_D$ of the ball penetrometer can be expressed as Eq. (13).

$$C_D = f_3(\alpha, R_{en}) = f_3(\alpha, \rho_{soil}, v, s_u) \qquad (13)$$

Based on Eqs. (3~13), the soil undrained shear strength back-analyzed based on the measured acceleration, a, and force, $F_m$, is expressed by Eq. (14).

$$s_u = \frac{W_b + F_m - (m + C_m m_{soil})a - 0.5 f_3(\alpha, \rho_{soil}, v, s_u)\rho_{soil} v^2 A_t - F_b}{A_t \cdot f_2(\alpha) \cdot f_1(v, \beta, \alpha, \rho_{soil}, s_u)} \qquad (14)$$

where the associated parameter in $f_1$, $f_2$ and $f_3$ are determined from numerical simulations. In Eq. (14), $W_b$ and $F_b$ can be calculated; $F_m$ and a are measured by load cell and accelerometer, v is obtained by integrating the data of the accelerometer, and $\beta$, $\alpha$, and $s_u$ are unknown parameters which can be back-analyzed based on a least-squares regression scheme.

For typical clayey seabed, the soil undrained shear strength increases linearly with depth. Hence $s_u$ can be expressed as:

$$s_u = s_{u0} + kz \qquad (15)$$

where $s_{u0}$ is the soil undrained shear strength at the mudline, z is the distance from the soil surface, k is the soil strength gradient. Based on the measured data from the accelerometer and load cell during the dynamic penetration process of the ball penetrometer, the soil strength parameters ($s_{u0}$, k), strain-rate parameter ($\beta$), and frictional coefficient ($\alpha$) are back-analyzed using Eqs. (14~15).

FIG. 7 and FIG. 8 show the variation of acceleration and velocity with penetration depth. A series of acceleration ($a_1$, $a_2$, ..., $a_n$), and velocity ($v_1$, $v_2$, ..., $v_n$) data with different depths are obtained from the measured data. Then the soil strength parameters ($s_{u0}$, k), strain-rate parameter ($\beta$), and frictional coefficient ($\alpha$) are back-analyzed based on Eq. (14) through a least squares regression scheme.

Advantages of the Present Invention

This invention relates to a free fall ball penetrometer with a booster, which belongs to a free fall penetrometer. The penetrometer is dynamically penetrated into the seabed through its kinetic and potential energies without any additional loading device. Therefore, the operation procedures of the present penetrometer are simple. The main measuring instrument is the ball penetrometer, which is primarily subject to the end bearing resistance, drag force, and buoyancy of the soil during the dynamic penetration process within the seabed. The soil strength parameters, including the soil undrained shear strength and strain-rate parameter, can be back-analyzed based on the measured data from the accelerometer and load cell. With an added booster, the penetrometer can obtain a deeper penetration depth within the seabed, and thus enlarge the range of the measured depth. Moreover, the booster can improve the directional stability of the ball penetrometer and avoid the ball from rotating in the soil. A load cell is added to the present penetrometer, hence the measurement accuracy can be further improved based on the data from both accelerometer and load cell.

DESCRIPTION OF DRAWINGS

FIG. 4a Booster and ball penetrometer with single-shaft connecting rod and external data acquisition method.

FIG. 4b Booster and ball penetrometer with three-shaft connecting rod and external data acquisition method.

Figures 1A, 1B:
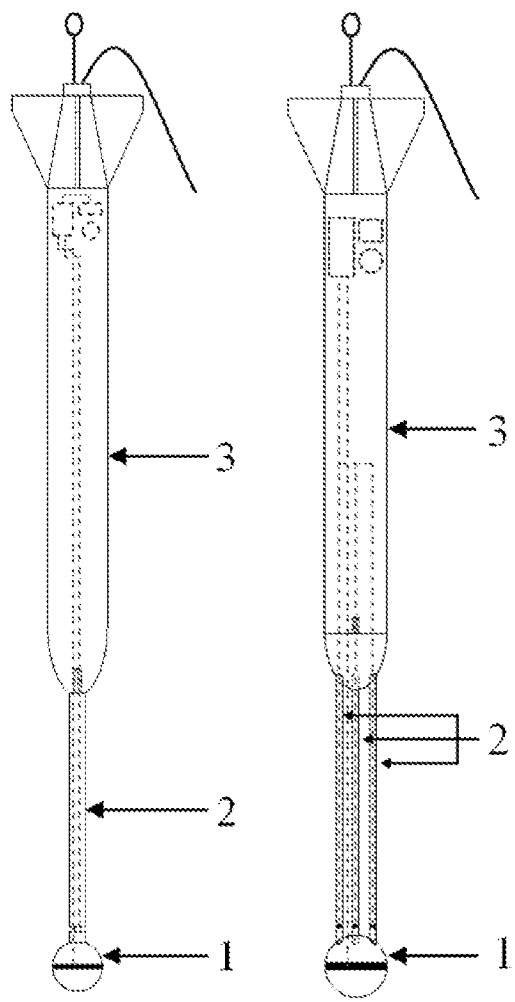
FIG. 1a Booster and ball penetrometer with single-shaft type connecting rod and wireless data acquisition method.
FIG. 1b Booster and ball penetrometer with three-shaft type connecting rod and wireless data acquisition method.
Figure 2A:
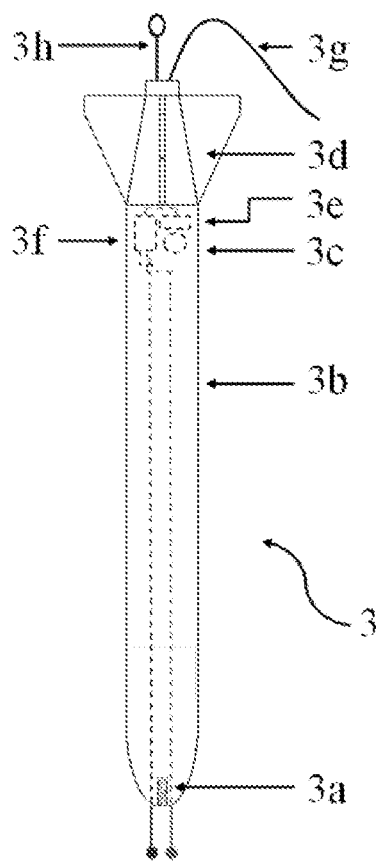
FIG. 2a Booster structure with single-shaft type connecting rod and wireless data acquisition method.
Figure 2B:
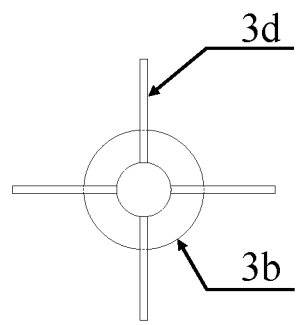
FIG. 2b Booster shaft and rear fins with single-shaft type connecting rod and wireless data acquisition method.
Figure 2C:
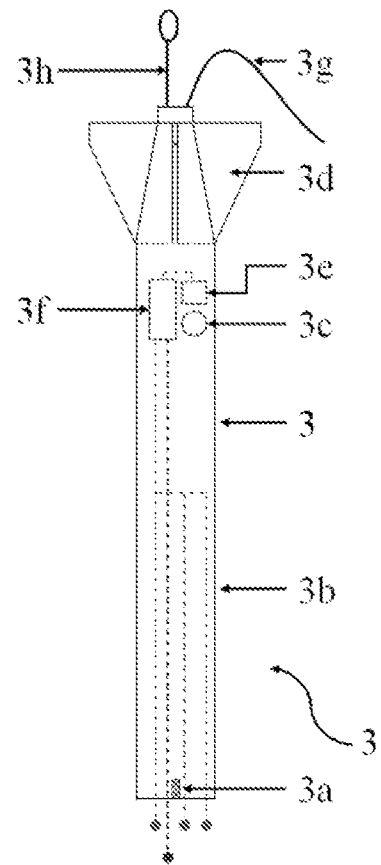
FIG. 2c Booster structure with three-shaft type connecting rod and wireless data acquisition method.
Figure 3A:
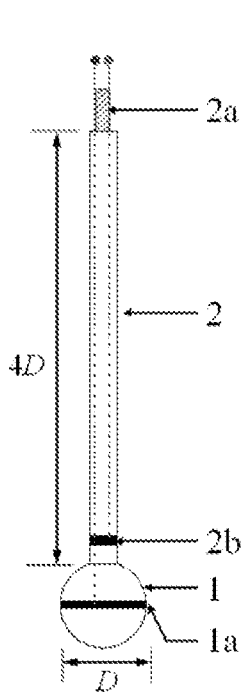
FIG. 3a Details of ball penetrometer and connecting rod with single-shaft type connecting rod.
Figure 3B:
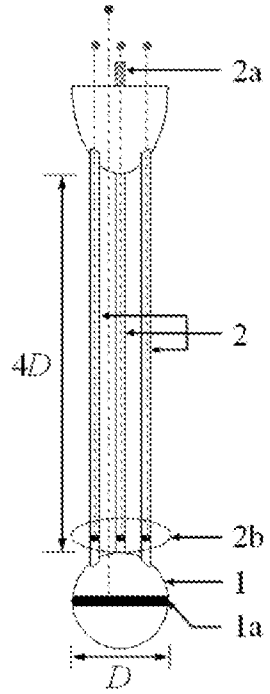
FIG. 3b Details of ball penetrometer and connecting rod with three-shaft type connecting rod.
Figure 3C:
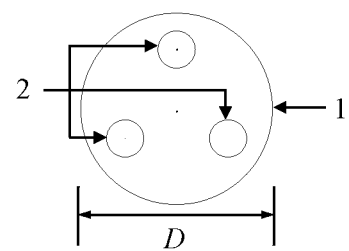
FIG. 3c Diagram of cross section of the three-shaft type connecting rod.
Figures 5A, 5B:
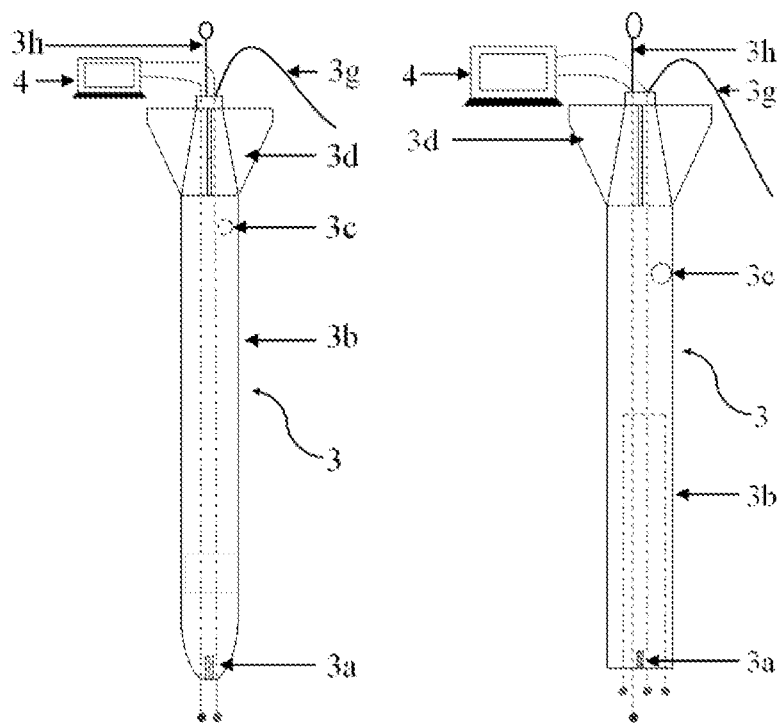
FIG. 5a Details of booster with single-shaft connecting rod and external data acquisition method.
FIG. 5b Details of booster with three-shaft connecting rod and external data acquisition method.

In the Figures: 1. Ball penetrometer; 1a. Pore water pressure transducer; 2. Connecting rod; 2a. External threads; 2b. Load cell; 3. Booster; 3a. Internal threads; 3b. Booster shaft; 3c. Accelerometer; 3d. Rear fins of booster; 3e. Power supply; 3f Internal data acquisition card; 3g. Retrieval line; 3h. Installation line; 4. External data acquisition instrument.

DETAILED DESCRIPTION

The operation procedures using the present free fall ball penetrometer with a booster are detailed shown as follows, with reference to the drawing sand technical solutions.

Step-1. The booster 3 and ball penetrometer 1 are connected through threads. Note the gravitational center of the ball penetrometer 1 is in line with the central axis of booster 3 to improve the directional stability and avoid large inclination of the ball penetrometer 1 during its free fall in water and dynamic penetration in the soil, and hence to increase the impact velocity and penetration depth of the ball penetrometer 1. Then connect the wires of all transducers to the internal data acquisition card 3f or external data acquisition instrument 4.

Step-2. Release the assembled penetrometer to the determined height above the seabed through the installation line 3h, and release the retrieval line 3g to the seabed surface. When the penetrometer is steady in water, turn on the internal data acquisition card or the external data acquisition instrument, and prepare to start collecting data.

Step-3. Release the installation line 3h, allowing the ball penetrometer 1 to freely fall in the water column and dynamically penetrate within the seabed until the ball penetrometer is rest in the soil. After the dynamic penetration, the ball penetrometer 1 is allowed to be left in the soil for a period of time, during which the dissipation of the pore water pressure in the soil around ball 1 is measured.

Step-4. After measurement, retrieve the ball penetrometer 1 by pulling the retrieval line 3g up. Then the recorded data from the internal data acquisition card 3f or external data acquisition instrument 4 are exported to a computer for analysis.

First, the velocity and penetration depth of the ball penetrometer 1 are analyzed based on the recorded data from the accelerometer 3c. The velocity of the ball penetrometer 1 can be obtained by Eq. (1), and the penetration depth of the ball penetrometer 1 can be obtained by Eq. (2).

$$v = \int_0^t a \, dt \tag{1}$$

$$s_t = \int_0^t v \, dt \tag{2}$$

where a is the vertical acceleration of the penetrometer measured by accelerometer 3c, v is the vertical velocity of the penetrometer, $s_t$ is the vertical is placement of the penetrometer.

The soil undrained shear strength can be back-analyzed based on the measured data of load cell 2b and accelerometer 2c, and the specified procedures are listed as below.

Figure 6:
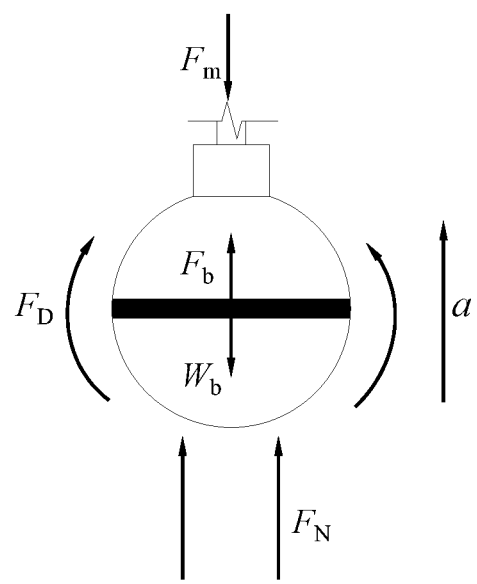
FIG. 6 Forces acting on the ball penetrometer.

The forces acting on the ball penetrometer 1 during the dynamic penetration process within the seabed are depicted in FIG. 6 and can be written in Eq. (3).

$$(m+m')a = W_b + F_m - F_N - F_D - F_b \tag{3}$$

where m is the mass of ball penetrometer 1, a is the acceleration measured by accelerometer 3c, $W_b$ is the submerge weight of ball penetrometer 1 in water, $F_m$ is the measured force by load cell 2b, $F_N$ is the soil end bearing resistance on ball penetrometer 1 during its dynamic penetration within the seabed, $F_D$ is the soil drag force on ball penetrometer 1 during its dynamic penetration within the seabed, $F_b$ is the soil buoyancy on ball penetrometer 1, which is expressed as the product of displaced soil volume by ball penetrometer 1 and soil effective unit weight ($\gamma'$). Morton et al. suggested that during the acceleration (or deceleration) of the ball penetrometer 1, the surrounding soil around the ball moves and accelerates (or decelerates) together with the ball. Hence it is necessary to consider the added mass, m, can be expressed in Eq. (4).

$$m' = C_m m_{soil} \tag{4}$$

where $C_m$ is the added mass coefficient, which is usually valued as $C_m = 0.5$, $m_{soil}$ is the displaced soil mass by the ball penetrometer 1, which can be described in Eq. (5).

$$m_{soil} = V_{ball} \rho_{soil} \tag{5}$$

where $V_{ball}$ is the displaced soil volume by the ball penetrometer 1, and $\rho_{soil}$ is the density of the soil.

If the soil strain-rate effect during the dynamic penetration of the ball penetrometer 1 within the soil is taken into consideration, the soil end bearing resistance, $F_N$, in Eq. (3) can be expressed in Eq. (6).

$$F_N = R_f N_c s_u A_t \tag{6}$$

where $N_c$ is the end bearing capacity factor of the ball penetrometer 1, $s_u$ is the measured soil undrained shear strength under the reference shear strain-rate, $A_t$ is the projected area of the ball penetrometer 1, $R_f$ is the strain-rate factor, which is expressed using the power law shown in Eq. (7).

$$R_f = \left(\frac{\dot{\gamma}}{\dot{\gamma}_{ref}}\right)^\beta = \left(\frac{v/D}{\dot{\gamma}_{ref}}\right)^\beta \tag{7}$$

where $\dot{\gamma}$ is the shear strain-rate defined as the ratio of the velocity, v, to the diameter, D, of the ball penetrometer 1, $\dot{\gamma}_{ref}$ is reference shear strain-rate, β is the strain-rate parameter usually ranging 0.034~0.14.

Liu et al. indicated that the strain-rate factor, $R_f$, of a free fall cone penetrometer depends on the velocity, v, strain-rate parameter, β, non-Newtonian Reynolds number, $R_{en}$, and frictional coefficient, α, based on numerical simulations. Moreover, the expression of the strain-rate factor, $R_f$, can be fitted based on numerical simulating results. Therefore, the factor $R_f$ is expressed by Eq. (8).

$$R_f = f_1(v, \beta, \alpha, R_{en}) \tag{8}$$

The non-Newtonian Reynolds number, $R_{en}$, in the above equation can be expressed as Eq. (9).

$$R_{en} = \frac{\rho_{soil} v^2}{s_u} \tag{9}$$

Therefore, the strain-rate factor $R_f$ is expressed as:

$$R_f = f_1(v, \beta, \alpha, \rho_{soil}, s_u) \tag{10}$$

The end bearing capacity factor, $N_c$, of the ball penetrometer 1 depends on the frictional coefficient, α, and can be described as Eq. (11).

$$N_c = f_2(\alpha) = A_1 + A_2 \alpha + A_3 \alpha^2 \tag{11}$$

where $A_1 \sim A_3$ are undetermined parameters which can be determined from numerical simulations. For example, Liu et al. established the relationship between the end bearing capacity factor and frictional coefficient of the free fall cone penetrometer based on numerical simulations.

The soil drag force during the penetration process of the ball penetrometer 1 in the soil shown in Eq. (3) can be described by Eq. (12).

$$F_D = \tfrac{1}{2} C_D \rho_{soil} v^2 A_t \tag{12}$$

where $C_D$ is the drag coefficient. Liu et al. indicated that the drag coefficient of a free fall cone penetrometer depends on the frictional coefficient, α, and non-Newtonian Reynolds number, $R_{en}$, and the expression of $C_D$ can be determined from numerical simulating results. Therefore, the factor $C_D$ can be expressed as Eq. (13).

$$C_D = f_3(\alpha, R_{en}) = f_3(\alpha, \rho_{soil}, v, s_u) \tag{13}$$

Based on Eqs. (3~13), the soil undrained shear strength back-analyzed based on the measured acceleration, a, and force, $F_m$, is expressed by Eq. (14).

$$s_u = \frac{W_b + F_m - (m + C_m m_{soil})a - 0.5 f_3(\alpha, \rho_{soil}, v, s_u) \rho_{soil} v^2 A_t - F_b}{A_t \cdot f_2(\alpha) \cdot f_1(v, \beta, \alpha, \rho_{soil}, s_u)} \tag{14}$$

where the associated parameters in $f_1$, $f_2$ and $f_3$ can be determined from numerical simulations. In Eq. (14), $W_b$ and $F_b$ are directly calculated, $F_m$ and a are measured by load cell and accelerometer, v is obtained by integrating the data of the accelerometer, and α, β, and $s_u$ are unknown parameters which can be back-analyzed based on a least-squares regression scheme.

For typical clayey seabed, the soil undrained shear strength increases linearly with depth. Hence $s_u$ can be expressed as:

$$s_u = s_{u0} + kz \tag{15}$$

where $s_{u0}$ is the soil undrained shear strength at the mudline, z is the distance from the soil surface, k is the soil strength gradient. Based on the measured data from the accelerometer and load cell during the dynamic penetration process of the ball penetrometer, the soil strength parameters ($s_{u0}$, k), strain-rate parameter (β), and frictional coefficient (α) are back-analyzed using Eqs. (14~15).

Figure 7:
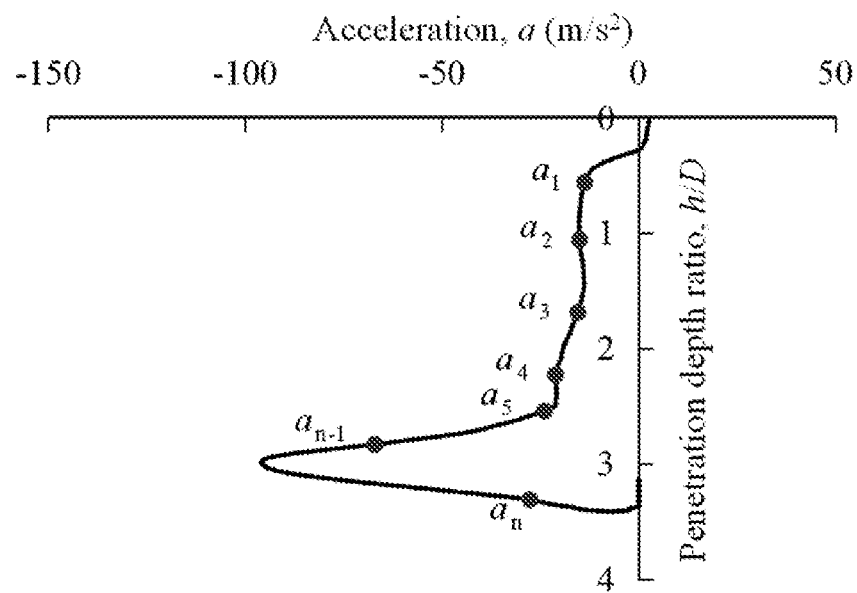
FIG. 7 Acceleration during the dynamic penetration of the penetrometer.
Figure 8:
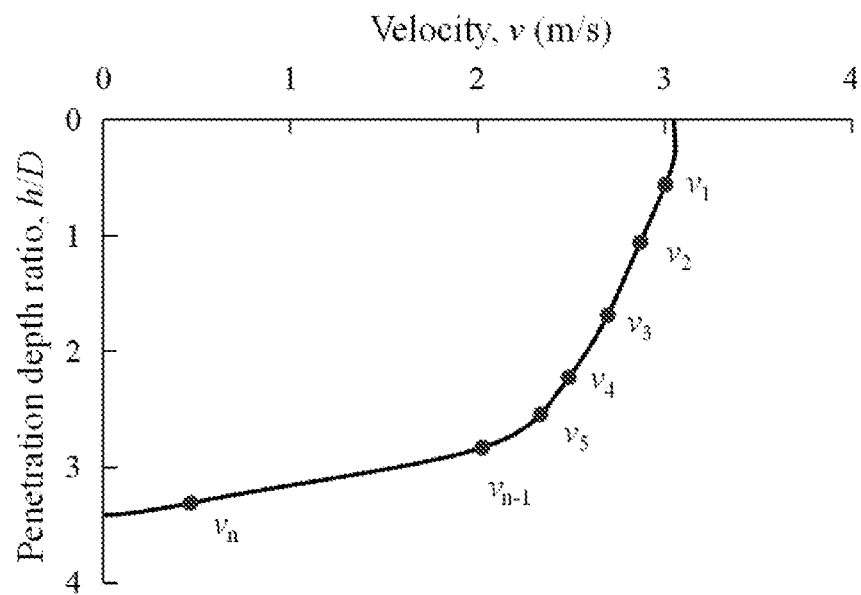
FIG. 8 Velocity during the dynamic penetration of the penetrometer.

FIG. 7 and FIG. 8 show the variation of acceleration and velocity with penetration depth. A series of acceleration ($a_1$, $a_2$, ..., $a_n$) and velocity ($v_1$, $v_2$, ..., $v_n$) data with different depths are obtained from the measured data. Then the soil strength parameters ($s_{u0}$, k), strain-rate parameter (β), and frictional coefficient (α) are back-analyzed based on Eq. (14) through a least-squares regression scheme.

As shown in FIGS. (1a~3c), the free fall ball penetrometer with a booster primarily comprises a ball penetrometer 1 and booster 3. The ball penetrometer 1 and booster 3 are connected by a connecting rod 2. The booster 3 comprises a cylindrical shaft 3b with ellipsoidal tip and retracted rear to reduce the drag force during the dynamic penetration process. The booster rear is set with rear fins 3d to improve the directional stability and reduce the inclination of the penetrometer during the falling process. The rear fins 3d are fixed to the booster 3 by being inserted into the slots reserved at the booster rear. The booster tip is provided with internal threads 3a to connect the external threads 2a of the connecting rod 2. If using wireless data acquisition and storage method, the internal space in the booster 3 is equipped with accelerometer 3c, power supply 3e, and internal data acquisition card 3f to collect associated data during the falling process. The internal data acquisition card 3f, which is connected to the power supply 3e, is used to record the data from the load cell, accelerometer, and pore water pressure transducer. If using external data acquisition and storage method, the wires of the load cell, accelerometer, and pore water pressure transducer are connected to the external data acquisition instrument 4. The length of the booster 3 can be adjusted based on practical requirement. In order to obtain a deep penetration depth, along and heavy booster may be used. For a long fall distance in water, the rear fins 3d of the booster should be enlarged to improve the directional stability in water. While with a low fall distance in water, the rear fins 3d can be replaced with smaller ones to reduce the water and soil resistance on the booster. One side of the connecting rod 2 is used to connect the ball penetrometer 1, and the other side of the connecting rod 2 is provided with external threads 2a to connect the booster 3. The axes of booster 3, connecting rod 2 and ball penetrometer 1 should be collinear to improve the directional stability of the whole system and avoid large inclination during the falling process. A load cell 2b between the ball penetrometer 1 and connecting rod 2 is used to measure the resistance of the ball penetrometer 1 during the dynamic penetration within the soil. A pore water pressure transducer 1a is configured in the equator of the ball penetrometer 1 to measure the pore water pressure in the soil around the ball. After measurement, the whole system is retrieved by pulling the retrieval line 3g up.

I claim:

1. A free fall ball penetrometer with a booster, comprising: a ball penetrometer and a connecting rod used to connect the ball penetrometer and the booster; the ball penetrometer is equipped with a pore water pressure transducer sealed to an equator of the ball penetrometer to measure dissipation of a pore water pressure after a dynamic penetration of the ball penetrometer; the ball penetrometer and a first side of the connecting rod are connected using a load cell, and the load cell is used to measure a resistance of the ball penetrometer during the dynamic penetration within a soil; a second side of the connecting rod is connected to the booster through threads; the connecting rod forms a certain distance between the ball penetrometer and the booster in order to avoid influence of the booster on a flow mechanism of the soil around the ball penetrometer, and a sectional area of the connecting rod is determined based on a criterion that a measured soil resistance on the ball penetrometer is not influenced by the connecting rod; the booster is used to increase a penetration depth of the ball penetrometer; the booster comprises a cylindrical shaft with an ellipsoidal tip and a streamlined rear to reduce a resistance on the booster during a free fall in water and dynamic penetration within the soil; a length of the cylindrical shaft varies based on practical measuring requirement; a rear of the cylindrical shaft is set with four rear fins to improve a directional stability of the booster during the free fall, and sizes of the rear fins are adjusted based on practical requirement; a tip of the booster is provided with internal threads to connect external threads on the connecting rod; a rear of the booster is reserved an internal space to accommodate an accelerometer, an internal data acquisition card, and a power supply device; the accelerometer is sealed in the internal space towards the rear of the booster; a wire of the accelerometer is extended from the rear of the booster and is connected to an external data acquisition instrument; an installation line and a retrieval line are attached to the rear of the booster; the booster and the ball penetrometer are retrieved by pulling the retrieval line up after measurement, and recorded data are exported to a computer for analysis.

2. The free fall ball penetrometer with the booster of claim 1, wherein the connecting rod comprises a single-shaft type connecting rod and a three-shaft type connecting rod, and the three-shaft type connecting rod owns an improved ability of resisting bending moment and disturbance.

3. The free fall ball penetrometer with the booster of claim 1, a distance between the ball penetrometer and the booster is four times a diameter of the ball penetrometer.

4. The free fall ball penetrometer with the booster of claim 1, a ratio of a sectional area $A_{shaft}$ of the connecting rod to a projected area $A_t$ of the ball penetrometer is less than 0.1.

5. The free fall ball penetrometer with the booster of claim 3, a ratio of a sectional area $A_{shaft}$ of the connecting rod to a projected area $A_t$ of the ball penetrometer is less than 0.1.

6. An operation method using the free fall ball penetrometer with the booster of claim 1, comprising:

step 1, screw the booster and the ball penetrometer through threads; make sure that a gravitational center of the ball penetrometer is in line with a central axis of the booster in order to improve a directional stability of the ball penetrometer during the free fall in water and the dynamic penetration in the soil, and to avoid large inclination of the ball penetrometer, and hence to increase an impact velocity and the penetration depth of the ball penetrometer; connect wires of the accelerometer, the pore water pressure transducer and the load cell to the internal data acquisition card and the external data acquisition instrument;

step 2, release the ball penetrometer with the booster to a determined height above a seabed through the installation line, and release the retrieval line to a seabed surface; and turn on the internal date acquisition card and the external data acquisition instrument and prepare to collect data when the ball penetrometer with the booster is steady in water;

step 3, release the installation line, allowing the ball penetrometer with the booster to freely fall in a water column and dynamically penetrate within the seabed until the ball penetrometer with the booster is rest in the soil; and after the dynamic penetration, the ball penetrometer with the booster is allowed to be left in the soil for a period of time, during which dissipation of the pore water pressure in the soil surrounding the ball penetrometer is measured;

step 4, retrieve the ball penetrometer with the booster by pulling the retrieval line up after measurement, and export recorded data from the internal data acquisition card and the external data acquisition instrument for analysis;

first, a velocity and a penetration depth of the ball penetrometer are analyzed based on recorded data from the accelerometer; and the velocity of the ball penetrometer is obtained by Eq. (1) and the penetration depth of the ball penetrometer is obtained by Eq. (2):

$$v=\int_0^t adt \qquad (1)$$

$$s_t=\int_0^t vdt \qquad (2)$$

where a is a vertical acceleration of the ball penetrometer measured by the accelerometer, v is a vertical velocity of the ball penetrometer, $s_t$ is a vertical displacement of the ball penetrometer;

a soil undrained shear strength is back-analyzed based on recorded data from the load cell and the accelerometer, and specific procedures comprise:

forces acting on the ball penetrometer during the dynamic penetration within the seabed is written in Eq. (3):

$$(m+m')a=W_b+F_m-F_N-F_D-F_b \qquad (3)$$

where m is a mass of the ball penetrometer, a is a vertical acceleration measured by the accelerometer, $W_b$ is a submerge weight of the ball penetrometer in water, $F_m$ is a measured force by the load cell, $F_N$ is a soil end bearing resistance on the ball penetrometer during the dynamic penetration within the seabed, $F_D$ is a soil drag force on the ball penetrometer during the dynamic penetration within the seabed, $F_b$ is a soil buoyancy on the ball penetrometer, which is expressed as a product of a displaced soil volume by the ball penetrometer and a soil effective unit weight γ'; and an added mass, m' is expressed in Eq. (4):

$$m'=C_m m_{soil} \qquad (4)$$

where $C_m$ is an added mass coefficient, which is valued as $C_m=0.5$, $m_{soil}$ is a displaced soil mass by the ball penetrometer, which is described in Eq. (5):

$$m_{soil}=V_{ball}\rho_{soil} \qquad (5)$$

where $V_{ball}$ is a displaced soil volume by the ball penetrometer, and $\rho_{soil}$ is a density of the soil;

when a soil strain-rate effect is taken into consideration during the dynamic penetration of the ball penetrometer, the soil end bearing resistance, $F_N$, in Eq. (3) is expressed in Eq. (6):

$$F_N = R_f N_c s_u A_t \qquad (6)$$

where $N_c$ is an end bearing capacity factor of the ball penetrometer, $s_u$ is a measured soil undrained shear strength under a reference shear strain-rate, $A_t$ is a projected area of the ball penetrometer, $R_f$ is a soil strain-rate factor, which is expressed using a power law expression shown in Eq. (7):

$$R_f = \left(\frac{\dot{\gamma}}{\dot{\gamma}_{ref}}\right)^\beta = \left(\frac{v/D}{\dot{\gamma}_{ref}}\right)^\beta \qquad (7)$$

where $\dot{\gamma}$ is a shear strain-rate defined as a ratio of the vertical velocity, v, of the ball penetrometer to a diameter, D, of the ball penetrometer, $\dot{\gamma}_{ref}$ is a reference shear strain-rate, $\beta$ is a strain-rate parameter usually ranging 0.034~0.14;

the soil strain-rate factor $R_f$ is expressed by Eq. (8):

$$R_f = f_1(v, \beta, \alpha, R_{en}) \qquad (8)$$

a non-Newtonian Reynolds number, $R_{en}$, in Eq. (8) is described as Eq. (9):

$$R_{en} = \frac{\rho_{soil} v^2}{s_u} \qquad (9)$$

hence the soil strain-rate factor, $R_f$, is expressed as:

$$R_f = f(v, \beta, \alpha, \rho_{soil}, s_u) \qquad (10)$$

the end bearing capacity factor of the ball penetrometer, $N_c$, depends on a frictional coefficient, $\alpha$, and is described as Eq. (11):

$$N_c = f_2(\alpha) = A_1 + A_2\alpha + A_3\alpha^2 \qquad (11)$$

where $A_1$~$A_3$ are undetermined parameters which are determined by numerical simulations;

the soil drag force of the ball penetrometer during its penetration within the soil in Eq. (3) is defined by Eq. (12):

$$F_D = \tfrac{1}{2} C_D \rho_{soil} v^2 A_t \qquad (12)$$

where $C_D$ is a drag coefficient;

the drag coefficient of the ball penetrometer is expressed as Eq. (13):

$$C_D f_3(\alpha, R_{en}) = f_3(\alpha, \rho_{soil}, v, s_u) \qquad (13)$$

based on Eqs. (3~13), the measured soil undrained shear strength under the reference shear strain-rate back-analyzed based on the vertical acceleration, a, and the measured force, $F_m$, is expressed by Eq. (14):

$$s_u = \frac{W_b + F_m - (m + C_m m_{soil})a - 0.5 f_3(\alpha, \rho_{soil}, v, s_u)\rho_{soil} v^2 A_t - F_b}{A_t \cdot f_2(\alpha) \cdot f_1(v, \beta, \alpha, \rho_{soil}, s_u)} \qquad (14)$$

where associated parameters in $f_1$, $f_2$ and $f_3$ are determined from numerical simulations; in Eq. (14), $W_b$ and $F_b$ are calculated, $F_m$ and a are measured by the load cell and the accelerometer, v is obtained by integrating measured data of the accelerometer, and $\alpha$, $\beta$, and $s_u$ are unknown parameters which are back-analyzed based on a least-squares regression scheme;

for typical clayey seabed, the measured soil undrained shear strength under the reference shear strain-rate increases linearly with depth, hence $s_u$ is expressed as:

$$s_u = s_{u0} + kz \qquad (15)$$

where $s_{u0}$ is a soil undrained shear strength at a mudline, z is a distance from a soil surface, k is a soil strength gradient; based on measured data from the accelerometer and the load cell during the dynamic penetration of the ball penetrometer, soil strength parameters ($s_{u0}$, k), the strain-rate parameter ($\beta$), and the frictional coefficient ($\alpha$) are back-analyzed using Eqs. (14~15).

* * * * *